United States Patent
Hsin et al.

(10) Patent No.: US 6,799,231 B2
(45) Date of Patent: Sep. 28, 2004

(54) VIRTUAL I/O DEVICE COUPLED TO MEMORY CONTROLLER

(75) Inventors: Ching-Ju Hsin, Hsinchu (TW);
Kwang-Lay Chen, Hsinchu (TW);
Po-Cheng Huang, Hsinchu (TW);
Pao-Hsuan Tseng, Hsinchu (TW);
Ming-Chun Su, Hsinchu (TW);
Tsung-Mong Shen, Hsinchu (TW)

(73) Assignee: Asix Electronics Corp., Hsinchu (TW)

( * ) Notice: Subject to any disclaimer, the term of this patent is extended or adjusted under 35 U.S.C. 154(b) by 38 days.

(21) Appl. No.: 10/274,884

(22) Filed: Oct. 22, 2002

(65) Prior Publication Data

US 2004/0078502 A1 Apr. 22, 2004

(51) Int. Cl.[7] .............................................. G06F 13/12
(52) U.S. Cl. ................ 710/62; 710/2; 710/3; 710/72
(58) Field of Search ............................ 710/62, 2, 3, 12, 710/72

(56) References Cited

U.S. PATENT DOCUMENTS

| 5,423,029 | A | * | 6/1995 | Schieve ....................... 714/42 |
| 5,758,182 | A | * | 5/1998 | Rosenthal et al. ............. 710/3 |
| 6,324,583 | B1 | * | 11/2001 | Stevens ....................... 709/230 |
| 6,334,155 | B1 | * | 12/2001 | Long et al. .................. 709/250 |
| 2002/0083364 | A1 | * | 6/2002 | Christensen et al. .......... 714/13 |
| 2002/0184410 | A1 | * | 12/2002 | Apel et al. ..................... 710/5 |

FOREIGN PATENT DOCUMENTS

EP     0732658 A1  *  9/1996  ........... G06F/13/10

* cited by examiner

*Primary Examiner*—Fritz M Fleming
(74) *Attorney, Agent, or Firm*—Bacon & Thomas, PLLC

(57) ABSTRACT

The invention relates to a virtual I/O device coupled to a memory controller in a microprocessor of computer, the virtual I/O device and a memory unit being in communication with the memory controller via a common interface so that any of a plurality of peripherals is capable of coupling to an arithmetic and logic unit (ALU) in the microprocessor via the virtual I/O device and the memory controller sequentially, and an excessive time spent on a processing of request and acknowledgement in handshake while packets being received or transmitted between a conventional I/O device and the I/O interface in the microprocessor is significantly reduced.

5 Claims, 5 Drawing Sheets

VIRTUAL I/O DEVICE COUPLED TO MEMORY CONTROLLER

FIELD OF THE INVENTION

The present invention relates to a computer input/output (I/O) interface and more particularly to a virtual I/O device coupled to a microprocessor through a memory controller of the computer.

BACKGROUND OF THE INVENTION

Conventionally, a microprocessor of a computer acts to perform two major tasks (e.g., data I/O and data processing) and others. In many cases data I/O is more frequently executed as compared with data processing (which occurs only occasionally). While an operating system (OS) of the computer plays a role in managing and controlling a data I/O interface and I/O device with respect to data input and output. Most importantly, the OS is operative to couple to a plurality of peripherals such as printers, scanner, card readers, camcorders, hubs, digital cameras, etc. referring to FIG. 1, constituent components of a typical microprocessor 10 of a computer plays comprise three major parts in terms of tasks being performed. The three major parts are an arithmetic and logic unit (ALU) 11 for performing arithmetic operations, logical operations, and all other operations associated with the arithmetic operations; a memory controller 12 coupled to the ALU 11 through a data bus, a control bus, and an address bus and coupled to a memory unit 20 through the data bus and the address bus so that the memory controller 12 can be controlled by the ALU 11 for reading programs and data from the memory unit 20 through the data bus and the address bus or writing intermediate data and results generated in the operations into the memory unit 20; and an I/O interface 13 coupled to the ALU 11 through the data bus, the control bus, and the address bus and coupled to an I/O device 30 through the data bus and the address bus so that the I/O interface 13 can be controlled by the ALU 11 for outputting data to the I/O device 30 or receiving data sent back from the I/O device 30. Hence, the microprocessor 10 of the computer can be coupled to the plurality of peripherals (e.g., printers, scanners, card readers, mouses, etc.) for controlling the same in order to achieve assigned tasks.

In the typical microprocessor 10 as stated above, the I/O interface 13 is operative to communicate instructions and data packets with the I/O device 30 by means of a complete protocol. Also, basically a handshake including a request and an acknowledgement is performed during a transmission or receiving of the packets. That is, when the microprocessor 10 desires to perform an instruction (e.g., reading, writing, continuous reading, continuous writing, DMA (direct memory access) conversion, interrupt signal, or status report), the microprocessor 10 may generate an associated setup token and data for forming a request packet. The packet is then sent to the I/O interface 13. Next, the I/O interface 13 processes the received packet prior to transmission to the I/O device 30. In the I/O device 30 a parsing is performed on the packet. Once instructions contained in the request packet are acknowledged, an acknowledgement packet will be generated for sending back to the I/O interface 13. This completes the handshake. Also, the parsed instructions are sent to a peripheral coupled to the I/O device 30. In response to a receiving of the packet, the peripheral is commanded by the microprocessor 10 to perform an assigned task. As to interrupt signal sent from the peripheral, the interrupt signal is again sent to the ALU 11 via the I/O device 30. Next, the ALU 11 stores the received interrupt signal in a packet being sent or received in a queue. Further queuing and storing procedures are performed for completion after the interrupt signal stopped.

A block diagram schematically depicting a packet transmission and receiving between the I/O interface 13 of the typical microprocessor of computer and the typical I/O device 30 is shown in FIG. 2. The I/O interface 13 generally comprises a plurality of frequently installed interface specifications for bus such as an AGP (Accelerated Graphics Port) 131, a PCI (Peripheral Component Interconnect) 132, an ISA (Industry Standard Architecture) 133, and a USB (Universal Serial Bus) 134. As such, the I/O interface 13 can process data in accordance with one of the various interface specifications for bus when the I/O interface 13 acts to send data between the microprocessor 10 and the peripherals. As to the interface specifications for bus, the AGP 131 is developed by Intel Corporation for 3D graphics having a very high data transmission capability. In detail, the AGP 131 is the most widely used bus for display card. The AGP 131 has a channel of 32 bits, a frequency of 66 MHz, and a maximum transmission rate of 1,056 MB. Further, the AGP bus does access data from memory directly rather than via the PCI bus. The PCI 132 is developed by Intel Corporation also as a bus for personal computer. The PCI 132 acts to enable respective peripherals to directly access a CPU (Central Processing Unit) of computer for increasing a data transmission rate between the microprocessor and the coupled peripheral. In detail, the PCI has a channel of 32 bits, a frequency of 66 MHz, and a maximum transmission rate of 264 (equal to 33×8) MB. Currently, the PCI has become a standard for Pentium, PowerPC and 486 bus. As to the ISA 133, it is a bus for personal computer. The ISA 133 has a data transmission rate of 16.66 BM. The ISA card is network interface card of 16 bits. A slot having a length about 13 cm to 14 cm provided on a motherboard of computer is reserved for ISA card. As to USB 134, it is a bus for interconnecting the computer and any coupled peripheral. The USB 134 is a data transmission standard being jointly developed by a number of global information companies such as Intel, IBM, Microsoft, Compaq, Northern Telecom, and Dell. The USB can perform either a full-speed data transmission mode of 12 Mbps or a lower-speed data transmission mode of 1.5 Mbps. Also, any peripheral incorporating the USB as data transmission interface has Plug-and-Play and hot insertion capabilities.

Referring to FIG. 2 again, the I/O device 30 comprises a plurality of converters 301, 302, 303, and 304 for cooperating with the embedded interface specifications for bus. Further, the converters 301, 302, 303, and 304 can parse a packet sent from one of the various interface specifications for bus. Furthermore, an acknowledgement packet is generated to send to the I/O interface 13 as instructions contained in the packet are acknowledged. This completes the handshake. At the same time, the parsed instructions are sent to the peripheral having corresponding interface specifications for bus, the peripheral being coupled to the I/O device 30. In response to a receiving of the packet, the peripheral is commanded by the instructions sent from the microprocessor to perform an assigned task.

In view of the above, an excessive time is spent on processing of a request and acknowledge in a handshake as a packet receiving or transmission between the I/O interface 13 and the I/O device 30 is performed. Also, the converters 301, 302, 303, and 304 in the I/O device 30 can only parse a packet with respect to the corresponding interface specifications for bust that are embedded in the I/O interface 13. As a result, the performance of the computer cannot increase correspondingly. Also, compatibility of the interface specifications for bus in the microprocessor is poor because it is limited by the corresponding converters in the I/O device 30. Thus a need for improvement exists.

SUMMARY OF THE INVENTION

The invention relates to a virtual I/O device coupled to a memory controller in a microprocessor of a computer, the virtual I/O device and a memory unit being in communication with the memory controller via a common interface so that a plurality of peripherals is capable of coupling to an arithmetic and logic unit (ALU) in the microprocessor via the virtual I/O device and the memory controller sequentially. The ALU is capable of writing an instruction packet into the virtual I/O device via the memory controller as any peripheral is commanded by the ALU, the virtual I/O device sending the written instruction packet to the peripheral, and the peripheral being commanded to perform an assigned task in response to receiving of the instruction packet; or alternatively, in response to receiving of a response packet from any peripheral, the virtual 110 device commanding the ALU to read the received response packet from the virtual I/O device via the memo controller.

A primary object of the present invention is to provide the virtual I/O device as a replacement for the conventional I/O device so that an excessive time spent on processing a request and acknowledgment in a handshake as packet receiving or transmission between the conventional I/O device and the I/O interface in the microprocessor is being performed is significantly reduced to a value of about zero, resulting in a great improvement of the computer performance.

Another object of the present invention is to enable the virtual converter to parse and compile the packet in accordance with one of the various interface specifications for bus so that a compatibility of the various interface specifications for bus in the microprocessor is not limited by the corresponding converters in the conventional I/O device, resulting in a greater flexibility.

The above and other objects, features and advantages of the present invention will become apparent from the following detailed description taken with the accompanying drawings.

DETAILED DESCRIPTION OF THE PREFERRED EMBODIMENTS

Figure 1:
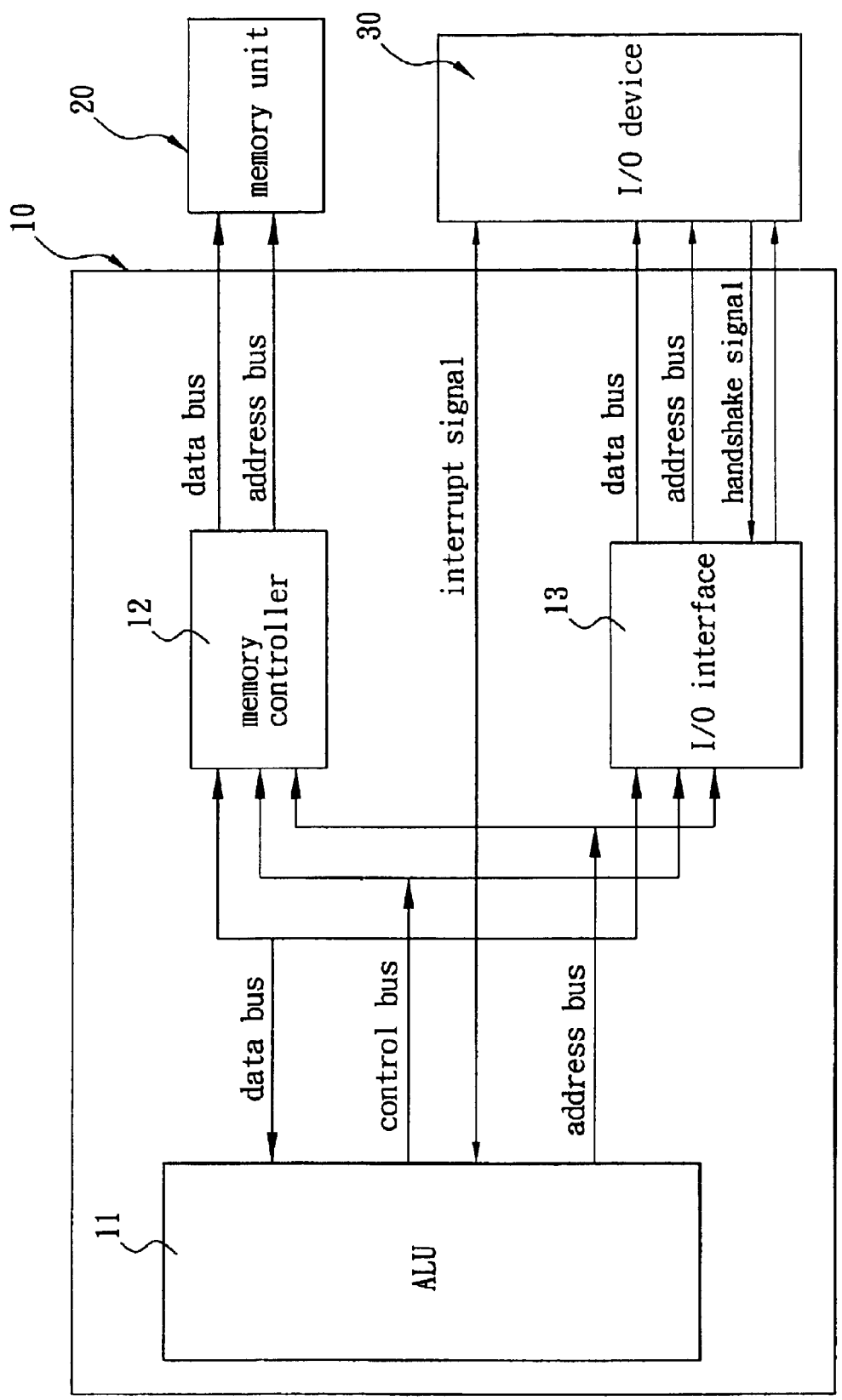
FIG. 1 is a block diagram schematically depicting the connection of a typical microprocessor to a memory unit and an I/O device.
Figure 2:
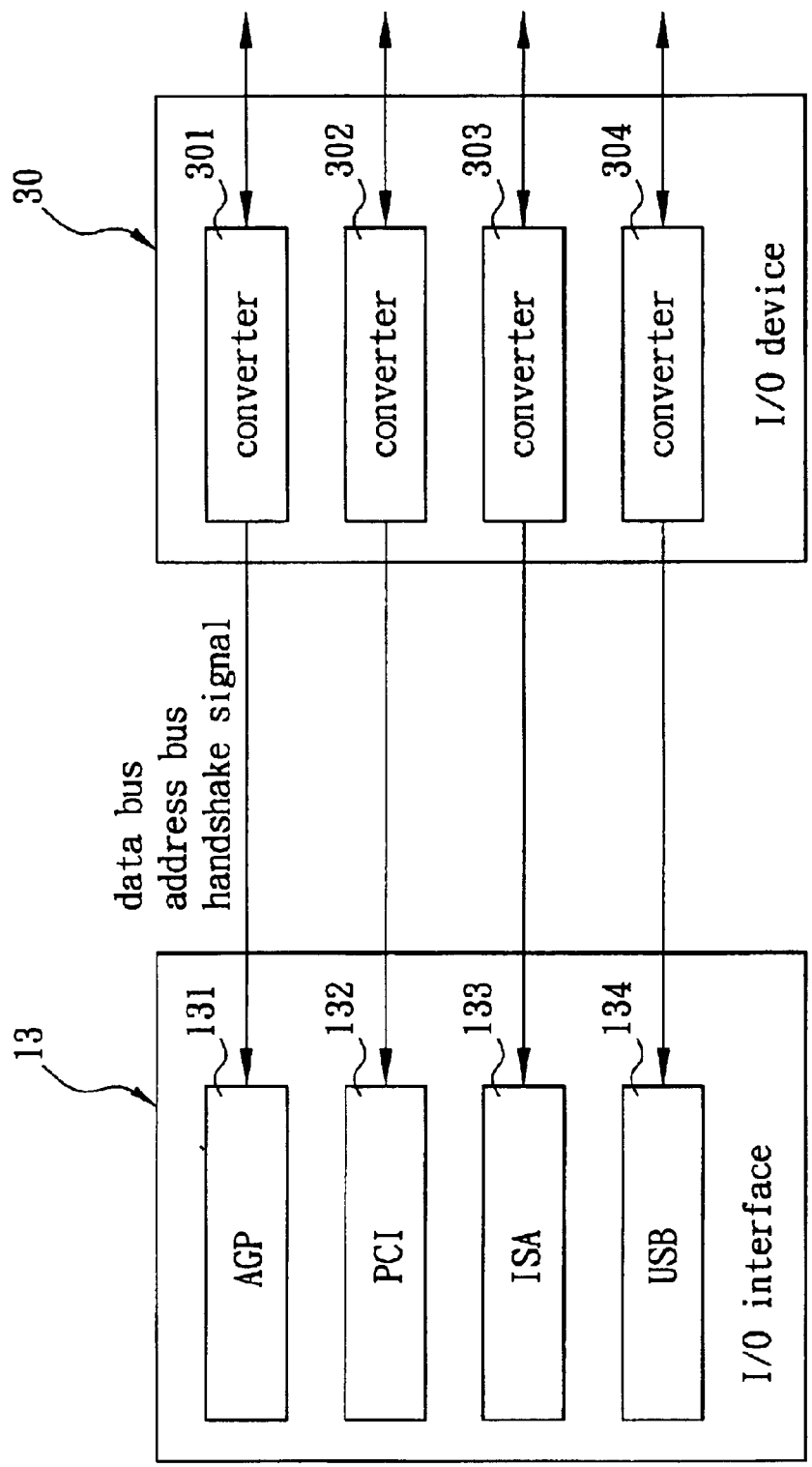
FIG. 2 is a block diagram schematically depicting a packet transmission and receiving between the I/O interface of the typical microprocessor of computer and the typical I/O device.
Figure 3:
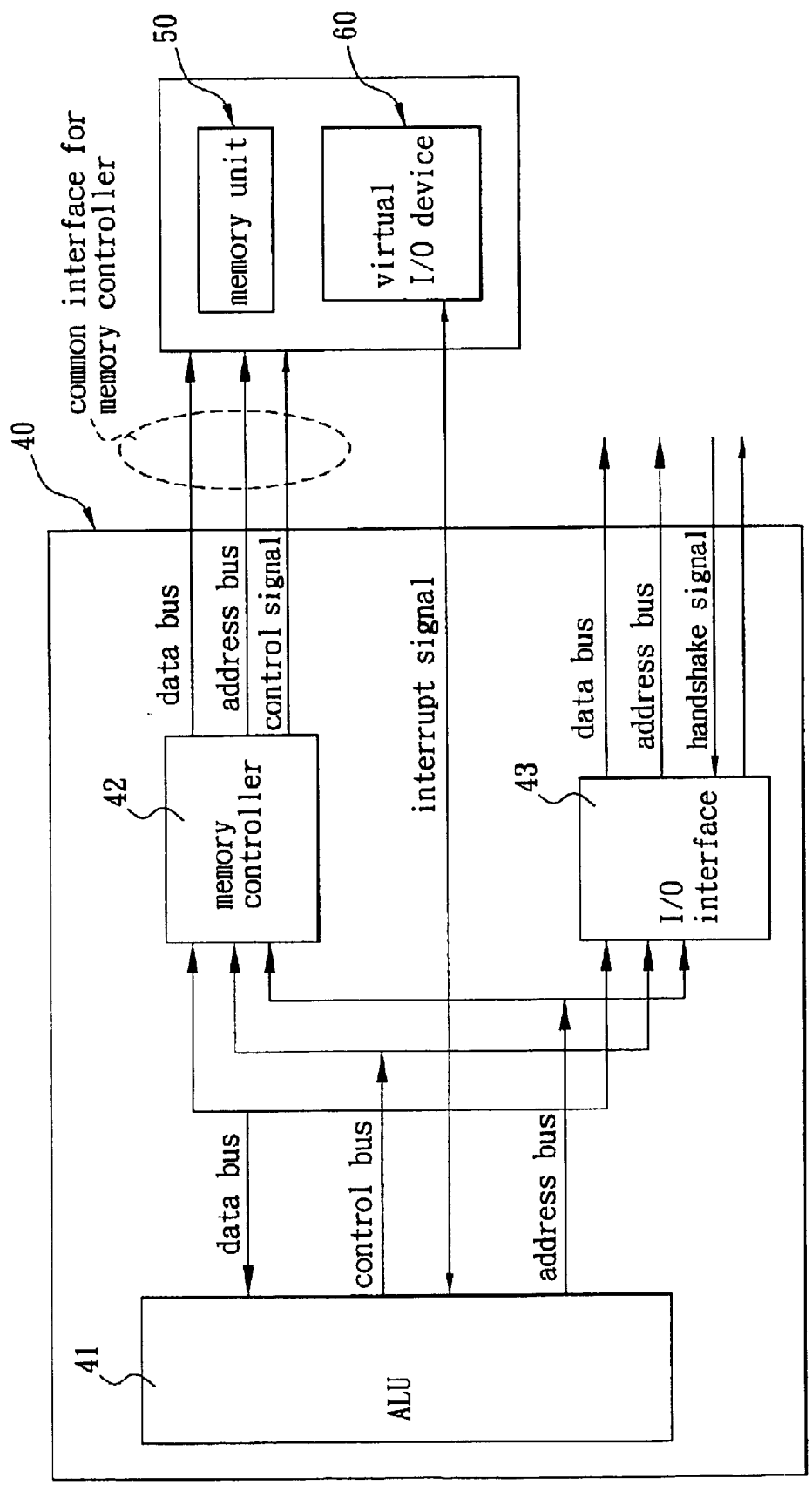
FIG. 3 is a block diagram schematically depicting the connection of a virtual I/O device of the invention to a memory unit via a microprocessor.

Referring to FIG. 3, there is shown the connection of a virtual I/O device 60 of the invention. Both the virtual I/O device 60 and a memory unit 50 are in communication with a memory controller 42 in a microprocessor 40 via a common interface which serves as a replacement of the well-known I/O device. Any peripheral can be coupled to an ALU 41 in the microprocessor 40 via the virtual I/O device 60 and the memory controller 42 sequentially. As such, the ALU 41 can write an instruction packet into the virtual I/O device 60 via the memory controller 42 as any peripheral is commanded by the ALU 41. Next, the virtual I/O device 60 sends the written instruction packet to the peripheral. Thereafter, the peripheral is commanded by the microprocessor 40 to perform an assigned task in response to receiving of the instruction packet. Alternatively, in response to receiving of a response packet from any peripheral, the virtual I/O device 60 commands the ALU 41 to read the received response packet from the virtual I/O device 60 via the memory controller 42.

Referring to FIG. 3 again, in the invention the ALU 41 of the microprocessor 40 is directly coupled to a peripheral via an I/O interface 43. Hence, the ALU 41 performs a transmission of packet through the I/O interface 43. When the microprocessor 40 desires to perform an instruction (e.g., reading, writing, continuous reading, continuous writing, DMA conversion, interrupt signal, or status report), the microprocessor 40 may send a data packet to be processed to the I/O interface 43 directly. Next, the I/O interface 43 processes the data packet prior to directly sending to a coupled peripheral. In response to a receiving of the data packet, the peripheral generates an acknowledgement packet for reply and sends the same to the I/O interface 43. This completes the handshake. At the same time, the peripheral, as commanded by the microprocessor 40 via the memory controller 42 and the virtual I/O device 60, performs an assigned task. As to an interrupt signal sent from the peripheral, the interrupt signal is sent to the ALU 41 via the virtual I/O device 60. Next, the ALU 41 stores the received interrupt signal in a packet being sent or received in a queue. Further queuing and storing procedures are performed for completion after the interrupt signal stopped.

Figure 4:
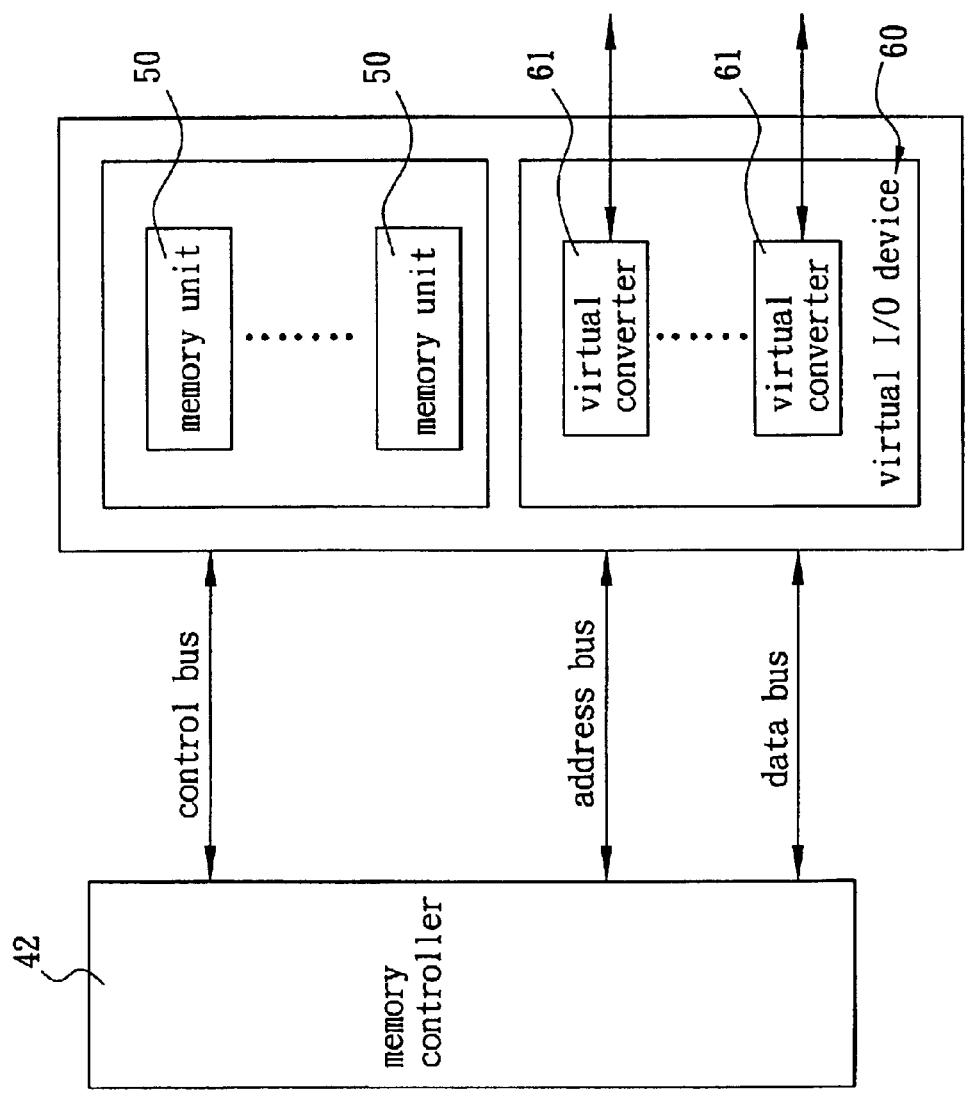
FIG. 4 is a block diagram schematically depicting the bus connection between the virtual I/O device and a memory controller in the microprocessor according to a preferred embodiment of the invention.
Figure 5:
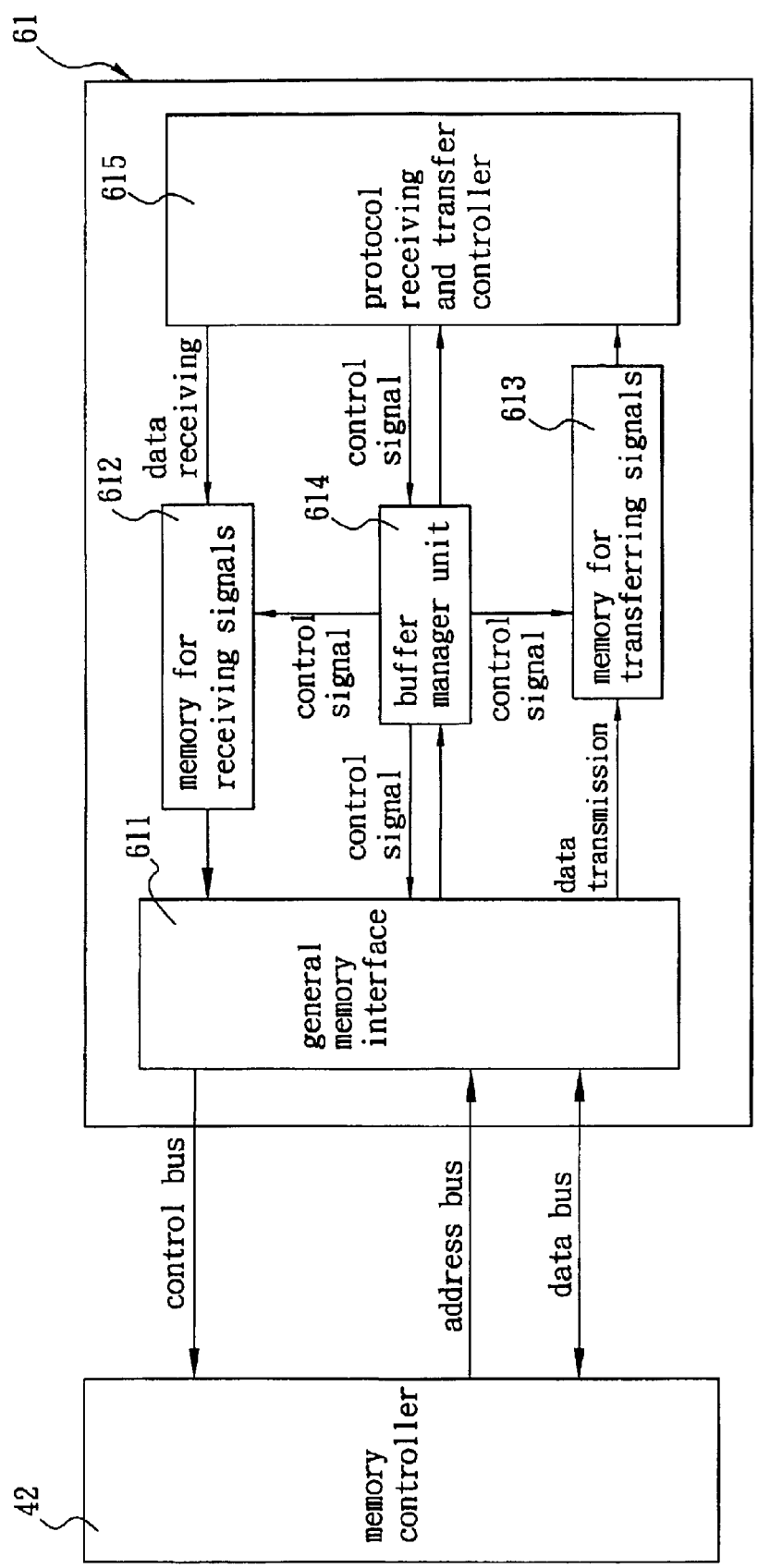
FIG. 5 is a detailed block diagram schematically depicting the bus connection between components of the converter and the memory controller of FIG. 4.

In a preferred embodiment of the invention, pursuant to one of the various interface specifications for bus such as AGP, PCI, ISA, and USB appropriate for the microprocessor and any one of peripherals, the virtual I/O device 60 comprises at least one virtual converter 61 as shown in FIGS. 4 and 5. Thus, respective virtual converter 61 can parse and compile an instruction packet to be sent or received based on one of the embedded various interface specifications for bus. In the embodiment, the virtual converter 61 comprises a general memory interface 611, a memory for receiving signals 612, a memory for transferring signals 613, a buffer manager unit 614, and a protocol receiving and transfer controller 615. In detail, the protocol receiving and transfer controller 615 is coupled to any peripheral. When the protocol receiving and transfer controller 615 receives a packet having one of the various interface specifications for bus from one of the peripherals, the protocol receiving and transfer controller 615 can parse and compile the received packet in accordance with the corresponding protocol. Next, the processed packet is sent to the corresponding peripheral. The memory for receiving signals 612 is coupled to the general memory interface 611 and the protocol receiving and transfer controller 615 respectively. Thus, the memory for receiving signals 612 can receive and store a packet sent from the protocol receiving and transfer controller 615. Next, the memory for receiving signals 612 sends the packet to the general memory interface 611. The memory for transferring signals 613 is coupled to the general memory interface 611 and the protocol receiving and transfer controller 615 respectively. Thus, the memory for transferring signals 613 can receive and store a packet sent from the general memory interface 611. Next, the memory for transferring signals 613 sends the packet to the protocol receiving and transfer controller 615. The general memory interface 611 is coupled to the memory controller 42 in the microprocessor via the control bus, the address bus, and the data bus. When the microprocessor issues an instruction to a peripheral, the general memory interface 611 writes the instruction packet into the memory for transferring signals 613. Alternatively, when the virtual I/O device 60 receives a reply packet from the peripheral, the microprocessor is commanded to read the received reply packet from the memory for receiving signals 612. The buffer manager unit 614 is coupled to each of the general memory interface 611, the memory for receiving signals 612, the memory for transferring signals 613, and the protocol receiving and transfer controller 615 for controlling the same in order to achieve the purpose of transmitting or receiving the instruction packet.

In the previous embodiment, the virtual I/O device 60 is coupled to the memory controller 42 in the microprocessor rather than the conventional I/O device. Hence, in the process of packet receiving or transmission the tasks assigned to the conventional I/O device previously are now assigned to the memory controller 42 and the virtual I/O device 60. The memory controller 42 views the virtual I/O device 60 as a memory unit when the memory controller 42 performs a packet receiving or transmission with respect to the virtual I/O device 60. Next, the memory controller 42 performs the packet receiving or transmission by writing data into or reading data from the virtual I/O device 60. Hence, an excessive time spent on a processing of request and acknowledgement in handshake as a packet receiving or transmission between the conventional I/O device and the I/O interface in the microprocessor being performed is significantly reduced to a value about zero. As a result, the computer performance is greatly improved.

Referring to FIGS. 3, 4, and 5, in other embodiments of the invention, the memory controller 42 is designed as an external device of the microprocessor 40. Thus, the virtual I/O device 60 and the memory unit 50 can share the inferface of the memory controller 42 in order to replace the typical I/O device. Hence, any peripheral can be coupled to the ALU 41 in the microprocessor 40 via the virtual I/O device 60 and the memory controller 42 sequentially. As an end, any peripheral can achieve an assigned task as it receives an instruction from the ALU 41.

Moreover, the protocol receiving and transfer controller 615 in the virtual converter 61 for coupling to any peripheral may parse and compile the packet into a packet to be read by the microprocessor 40 in accordance with the protocol as a packet having one of the various interface specifications for bus from any peripheral is received. As a result, a compatibility of the various interface specifications for bus in the microprocessor 40 is not limited by the embedded interface specifications for bus in the I/O interface 43, i.e., a greater flexibility is effected.

What is claimed is:

1. A virtual input/output (I/O) device coupled to a memory controller in a microprocessor of a computer, the virtual I/O device and a memory unit being arranged to communicate with the memory controller via a common interface so that any of a plurality of peripherals connected to the virtual I/O device is capable of coupling to an arithmetic and logic unit (ALU) in the microprocessor via the virtual I/O device and the memory controller sequentially, wherein the ALU is capable of writing an instruction packet into the virtual I/O device via the memory controller when a peripheral device is to be commanded by the ALU, the virtual device sends the written instruction packet to the peripheral, and the peripheral is commanded by the microprocessor to perform an assigned task in response to receiving of the instruction packet; and wherein, in response to receiving of a response packet from the peripheral, the virtual I/O device commands the ALU to read the received response packet from the virtual I/O device via the memory controller.

2. The virtual I/O device of claim 1, wherein the virtual I/O device is directly coupled to the ALU via an interrupt signal so that in response to receiving of the interrupt signal from the peripheral, the interrupt signal is sent to the ALU via the virtual I/O device, the ALU stores the received interrupt signal in a packet being sent or received in a queue, and performs further queuing and storing procedures for completion after the interrupt signal stops.

3. The virtual I/O device of claim 1, wherein pursuant to one of various embedded interface specifications for bus appropriate for a microprocessor and any peripheral, the virtual I/O device comprises at least one virtual converter capable of parsing and compiling an instruction packet to be sent or received based on one of the embedded interface specifications for bus.

4. The virtual I/O device of claim 3, wherein each virtual converter comprises:

a protocol receiving and transfer controller coupled to any peripheral, the protocol receiving and transfer controller being operative to receive a packet having one of the various interface specifications for bus from any peripheral for parsing and compiling the received packet in accordance with a corresponding protocol;

a memory for receiving signals coupled to the protocol receiving and transfer controller, the memory for receiving signals being operative to receive and store the packet sent from the protocol receiving and transfer controller;

a general memory interface coupled to the memory controller in the microprocessor via a control bus, an address bus, and a data bus so that when the virtual I/O device receives a reply packet from the peripheral, the general memory interface is operative to send the received reply packet from the memory for receiving signals to the memory controller;

a memory for transferring signals coupled to the general memory interface and the protocol receiving and transfer controller respectively, the memory for transferring signals being operative to receive and store the packet sent from the general memory interface prior to sending the packet to the protocol receiving and transfer controller; and a buffer manager unit coupled to each of the general memory interface, the memory for receiving signals, the memory for transferring signals, and the protocol receiving and transfer controller for controlling the same in order to achieve a transmission or receiving of the instruction packet.

5. The virtual I/O device of claim 4, wherein the memory controller views the virtual I/O device as the memory unit when the memory controller performs a packet receiving or transmission with respect to the virtual I/O device, and the memory controller performs the packet receiving or transmission by writing data into or reading data from the virtual I/O device.

* * * * *